United States Patent [19]

Salzer

[11] 4,029,364
[45] June 14, 1977

[54] DEVICE FOR LOADING AIR WITH A CONTROLLABLE AMOUNT OF A GRANULAR OR POWDERY MATERIAL

[75] Inventor: Roman Salzer, Inzersdorf, Austria

[73] Assignee: Interliz Anstalt, Vaduz, Liechtenstein

[22] Filed: Sept. 5, 1975

[21] Appl. No.: 610,907

[30] Foreign Application Priority Data

July 7, 1975 Austria ............................ 95233/75

[52] U.S. Cl. .................................. 302/34; 302/53
[51] Int. Cl.² ..................................... B65G 53/16
[58] Field of Search .................. 302/34, 40, 42, 45, 302/46, 57, 51–54; 222/193–195; 259/DIG. 17; 239/15, 143; 214/170, 170 B

[56] References Cited

UNITED STATES PATENTS

| 528,418 | 10/1894 | Duckham | 302/54 |
| 1,067,781 | 7/1913 | Canniff | 302/53 |
| 1,559,810 | 11/1925 | Trent | 302/53 |
| 1,918,330 | 7/1933 | Green | 302/34 |
| 3,179,378 | 4/1965 | Zenz et al. | 302/53 |

FOREIGN PATENTS OR APPLICATIONS

| 494,985 | 6/1954 | Italy | 222/195 |
| 958,136 | 5/1964 | United Kingdom | 302/53 |

Primary Examiner—Evon C. Blunk
Assistant Examiner—Jeffrey V. Nase
Attorney, Agent, or Firm—Frank J. Jordan

[57] ABSTRACT

A device for loading a stream of air with a controllable amount of granular or powdery material includes a container for the material. An annular conduit disposed in the free space above the material in the container has nozzles which are operable to discharge compressed air into the container to blow and churn-up the material. A double tube vertically and slidably mounted on the cover of the container is operable to conduct the compressed air to the annular conduit and to receive the air laden with material which has been blown and churned-up by the compressed air discharged into the container by the nozzles on the annular conduit.

3 Claims, 2 Drawing Figures

DEVICE FOR LOADING AIR WITH A CONTROLLABLE AMOUNT OF A GRANULAR OR POWDERY MATERIAL

BACKGROUND OF THE INVENTION

This invention relates to a device for the loading of air with a controllable amount of a powdery or fine granular material which is contained in a container by whirling or churning-up the material, the device also being capable of blowing the laden air out of the container. The device is particularly adaptable to load air with powdered magnesium oxide and to blow the loaded air out of a container into a heating device.

When operating an oil furnace, arrangements have heretofore been made to introduce into the burner and into the combustion gases a mixture of air and a material such as magnesium oxide in order to prevent in one respect noxious corrosion of exposed metal parts, and in another respect, to prevent soiling of the boiler, pipe conduits, fittings and exhaust gases.

However, with such arrangements, problems arise because the magnesium oxide powder is hygroscopic and causes clogging or plugging-up due to the presence of moisture. The clogging causes disturbances in the addition of magnesium oxide into the heating system, thereby causing operating difficulties in the whole combustion system. Devices are known which add the magnesium oxide by using stirring means or other machanical means and which add the magnesium oxide through a controllable aperture to an air stream which serves in the movement of the powder. These known devices have the disadvantages that the apertures plug up frequently, and continuous and constant blowing in of powder into the oil combustion arrangement is not assured. Also the powder may creep through packings into the mechanical means which might lead to operating problems. Devices for the whirling-up and blowing-out of powdery materials are also known where such an air stream is blown into an aperture of a container holding the material, such air stream being directed against the surface of the powder in order to whirl it up, and where the air stream exits together with the whirled-up material through another aperture.

These known devices do not produce whirling currents energetic enough to effect reliable dust production out of the powder storage so that the reservoir used with these devices may have a comparatively small capacity. Thus heating arrangements having several boilers must be furnished with several individual devices for each boiler, and large amounts of air are needed in order to raise the dust from the powdered material, a fact which necessitates large blower capacities. Furthermore no constant intensive raising of dust is obtained in that the loading of air with equally large amounts of powder is not accomplished when the surface of the powder in the reservoir sinks slowly, and it is difficult to raise the dust continually when it is all the way down at the bottom of the container and also to blow it out of the container.

Accordingly, an object of the present invention is to overcome the disadvantages of the known prior art devices by the provision of an arrangement for insuring a continuous, constant, and also controllable raising of dust or powdery material while having a large capacity for the powder, the device of the present invention making it possible to furnish large and even extremely large boiler arrangements with magnesium powder.

The aforementioned object is attained, according to the present invention, by a device having an annular tube or conduit which is generally horizontally disposed in the upper free space of a container, the container being filled to the extent that some free space still remains at its top. The annular tube is disposed at a distance radially spaced from cylindrical wall of the container. A plurality of nozzles are arranged on the annular tube, such nozzles being at least partially downwardly directed.

Essentially in the center of the cover of the container, there is arranged an essentially vertical double tube arrangement which is vertically and slidably mounted on the cover. The double tube arrangement carries the aforementioned annular tube. One tube of the double tube arrangement is connected at its lower end to the annular tube and is connected at its upper end to a conduit which supplies compressed air. The other tube of the double tube arrangement passes into the interior of the container with its lower end disposed substantially at or just above the height of the annular tube, thus forming the blow-out conduit for the air laden with the whirled or churned-up granular or powder material. This arrangement produces a strong whirling stream directed down towards the surface of the material as well as a whirling stream rotating in the direction of the circumference of the container. The air stream acts like a tornado or cyclone causing a dusting-up of the powder, and eventually breaks lumps and large particles by whirling and by knocking them against the wall of the container.

The amount of air required for blowing the dust upwardly and for blowing it out may be small, so that the energy requirement for providing the compression of air may be kept small. It is mainly possible for the blowhead, formed by the annular tube and its nozzles, to follow at a constant distance the slowly subsiding surface of the powdered material, so that constant raising of dust and loading of the air is obtained until the container is completely emptied. Thus it is possible to work with constant air pressure so that devices for changing the pressure of the air in correlation to the slow emptying of the container are not required. It is easy to proportion the amount of the powder which should be blown out, and how much of it should be contained in the air. At a certain constant air pressure the whirled or churned-up amount of powder is larger the closer the blow head is guided towards the surface of the bulk powder in the container. Thus the amount of powder blown out is regulated and kept constant by the speed at which the double tube arrangement, the annular tube, and its nozzles are guided downwardly. For this purpose, preferably the double tube arrangement may be coupled with a mechanical drive which effects a continual downward motion of the double tube arrangement, the speed of such motion being regulated by adjustment of the driving means.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claim.

The construction and operation of the invention, however, together with additional objects and advantages thereof will be best understood from the following description of specific embodiments when read in connection with the accompanying drawings.

SUMMARY OF THE INVENTION

A device for loading a stream of air with a controllable amount of granular or powdery material comprises a container having a cover with the material being disposed in the container and a free space being provided between the upper surface of the material and the cover. An annular conduit having a plurality of nozzles is disposed in the free space. A double tube means is vertically and slidably mounted on the cover, the double tube means comprising a pair of tubes, one of which carries the annular conduit. A connection connects the one tube to a source of compressed air for supplying compressed air to the annular conduit, the other tube having a lower end disposed within the free space in the container to receive air laden with the material which has been blown and churned-up by the compressed air discharged into the container by the nozzles on the annular conduit.

DESCRIPTION OF THE PREFERRED EMBODIMENTS

Figure 1:
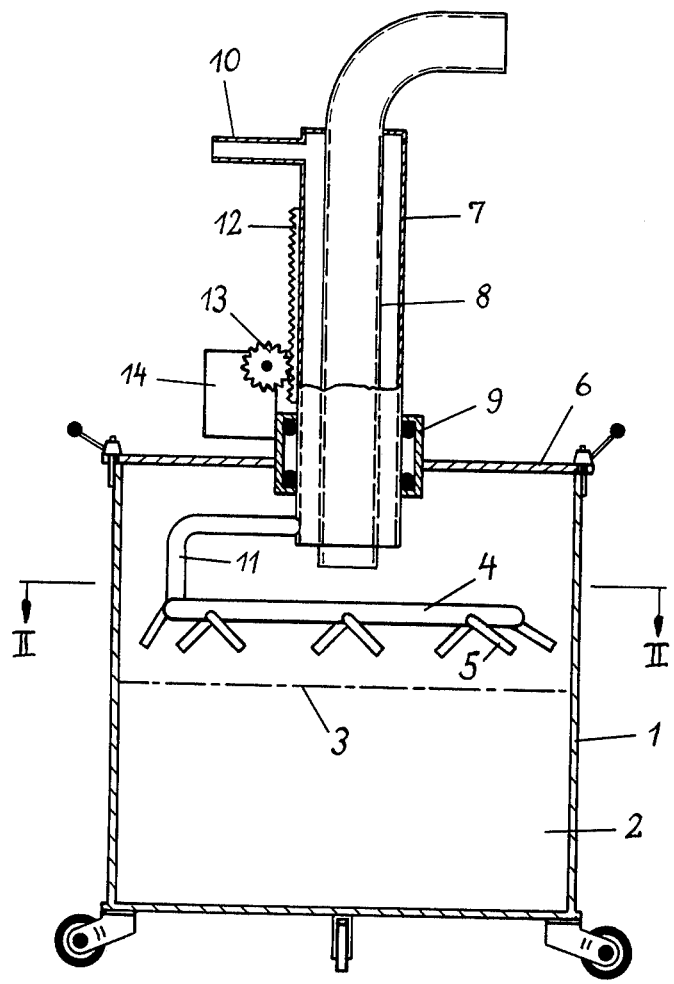
FIG. 1 is a vertical sectional view of a device according to one embodiment of the invention
Figure 2:
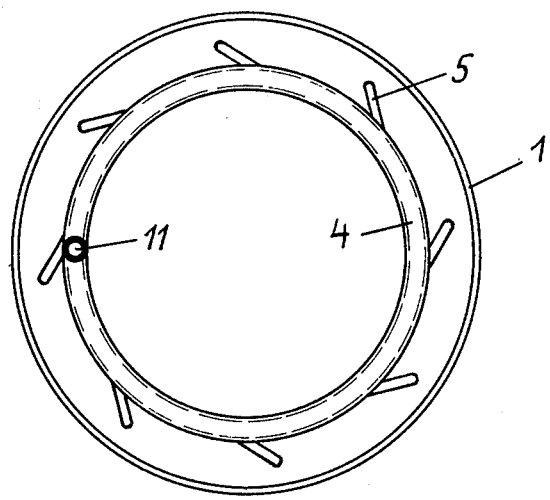
FIG. 2 is a view taken along the line II-II in FIG. 1.

Referring to the drawings there is shown a cylindrical container 1 which is filled with a supply of powdery material 2 leaving some free space thereabove. A horizontally disposed annular tube 4 is located in the upper part of the container 1 above the surface 3 of the powdery material 2, the tube 4 being at a comparatively small distance from the wall of the container 1. A plurality of nozzles 5 are disposed on the annular tube 4, as shown in FIGS. 1 and 2, the nozzles are preferably directed downwardly and towards the sidewalls of the container 1 and disposed to extend approximately tangentially relative to the annular conduit.

A vertical double tube is disposed at the center of a cover 6 of the container 1. The double tube consists of an external tube 7 and a coaxial internal tube 8. The double tube passes through the cover 6, and is slidably sealed in a stuffing box 9 of the cover 6 such that the double tube may slide in a vertical direction while the seal is maintained. The annular space between the internal tube 8 and the external tube 7 serves for the introduction of the compressed air and the external tube 7 is furnished at its upper closed end with a connector 10 serving as an inlet for compressed air. A conduit 11 connects this annular space at its closed bottom end with the annular tube 4, the latter being carried by the double tube by the aid of the conduit 11. The interior tube 8 extends with its open bottom end approximately to the level of the annular tube 4 into the interior container space and serves as the flowing-out conduit in which air, laden with whirled-up material leaves the container 1. A conduit for further transport of the mixture of air and the whirled-up powder may be connected to the upper end of the interior tube 8.

The double tube 8 is furnished with a ratchet 12 which meshes with a gear 13 of a schematically illustrated driving means 14. The driving means consists of an electrical motor furnished with a reducing drive. The gear 13 is rotated very slowly by an electrical motor whose rotational speed is varied with the aid of, for example, a potentiometer and which may be set at a definite setting value so that the double tube together with the annular tube 4, carried by the double tube, sinks slowly and steadily into the container as the powdery material is used up. Thus the annular tube 4 follows the surface 3 of the powdery material down to the compete emptying of the container 1, whereby a continuous dusting-up of the powdery material and a continuous loading of the air with powdery material is assured. The amount of air to be whirled up and to be blown out of container 1 may be increased or decreased by regulating the speed of the downward sliding movement of the double tube either to a larger or smaller amount.

It is thought that the invention and many of its attendant advantages will be understood from the foregoing description and that it will be apparent that various changes may be made in the form, construction, arrangements of the parts without departing from the spirit and scope of the invention or sacrificing all of its material advantages. The form heretofore described being merely a preferred embodiment thereof.

What is claimd is:

1. A device for loading a stream of air with a controllable amount of granular or powdery material comprising a container having a cover, said material being disposed in said container with a free space being provided between the upper surface of said material and said cover, an annular conduit disposed in a general plane which is substantially horizontally disposed, said annular conduit being spaced from the wall of the container and having a plurality of nozzles disposed in said free space, said nozzles extending approximately tangentially relative to said annular conduit, a double tube means vertically and slidably mounted on said cover, sealing means slidably sealing said double tube means on said cover, driving means for raising and lowering said double tube means, said double tube means comprising a pair of tubes, one of said tubes carrying said annular conduit, a connection connecting said one tube to a source of compressed air for supplying compressed air to said annular conduit, the other tube having a lower end disposed within said free space in said container, said lower end of said other tube being disposed substantially aligned with the center of said annular conduit and at a level substantially at the general plane of said annular conduit to receive air laden with said material which has been blown and churned-up by the compressed air discharged into said container by said nozzles on said annular conduit.

2. A device according to claim 1 wherein said driving means comprises a motorized drive unit operably engaging said double tube means to effect a continual downward movement of said double tube means according to the lowering of the level of the granular or powdery material in the container.

3. A device according to claim 1 wherein said nozzles are downwardly inclined relative to horizontal.

* * * * *